(12) United States Patent
Pirri et al.

(10) Patent No.: US 9,796,113 B2
(45) Date of Patent: Oct. 24, 2017

(54) CONCRETE MIXER WITH PERFECTED AUXILIARY DEVICE

(71) Applicant: CIFA S.P.A., Senago (IT)

(72) Inventors: Nicola Pirri, Milan (IT); Emanuele Zorzi, Cesano Maderno (IT); Federico Cheli, Milan (IT); Ferdinando Mapelli, Olginate (IT); Davide Tarsitano, Caronno Pertusella (IT)

(73) Assignee: CIFA S.P.A., Senago (IT)

( * ) Notice: Subject to any disclaimer, the term of this patent is extended or adjusted under 35 U.S.C. 154(b) by 151 days.

(21) Appl. No.: 14/770,712

(22) PCT Filed: Feb. 26, 2014

(86) PCT No.: PCT/IB2014/059276
§ 371 (c)(1),
(2) Date: Aug. 26, 2015

(87) PCT Pub. No.: WO2014/132208
PCT Pub. Date: Sep. 4, 2014

(65) Prior Publication Data
US 2016/0199999 A1    Jul. 14, 2016

(30) Foreign Application Priority Data

Feb. 28, 2013    (IT) .............................. MI2013A0298

(51) Int. Cl.
*B28C 5/00* (2006.01)
*B60K 25/00* (2006.01)
(Continued)

(52) U.S. Cl.
CPC ................ *B28C 5/421* (2013.01); *B60K 6/48* (2013.01); *B60K 25/00* (2013.01); *B60K 25/06* (2013.01);
(Continued)

(58) Field of Classification Search
CPC ............ B28C 5/421; B60K 25/06; B60P 3/16
See application file for complete search history.

(56) References Cited

U.S. PATENT DOCUMENTS

| 4,097,925 A * | 6/1978 | Butler, Jr. | ................. B28C 5/42 366/2 |
| 6,971,463 B2 * | 12/2005 | Shore | ....................... B60K 6/12 180/165 |

(Continued)

FOREIGN PATENT DOCUMENTS

| DE | 202009001416 | 7/2010 |
| IT | MI2012A000093 | 1/2012 |

(Continued)

OTHER PUBLICATIONS

International Search Report and Written Opinion, issued in the corresponding PCT application No. PCT/IB2014/059276, dated May 12, 2014, 9 pages.

*Primary Examiner* — Tony G Soohoo
*Assistant Examiner* — Anshu Bhatia
(74) *Attorney, Agent, or Firm* — Hamre, Schumann, Mueller & Larson, P.C.

(57) ABSTRACT

A concrete mixer truck comprises a vehicle provided with a heat engine and a concrete mixer having a rotating drum and an auxiliary device provided with a unit for generating electric energy that selectively feeds an electric motor connected to the rotating drum. The electric energy generating unit comprises at least an alternator selectively connectable to the heat engine and to a movement unit of the vehicle by means of a gearbox and a power take-off positioned between the clutch of the vehicle and the gearbox. The alternator is configured to convert mechanical energy into alternate electric energy and vice versa. The electric energy generating unit also comprises at least one accumulator and reversible conversion means of electric energy, connected to the accu- (Continued)

mulator and to the alternator in order to selectively take continuous electric energy from the former and supply alternate electric energy to the latter, to move the drive wheels of said movement unit, or to convert the alternate electric energy produced by the alternator into continuous electric energy to be transferred to the accumulator.

10 Claims, 4 Drawing Sheets

(51) Int. Cl.
  *B28C 5/42* (2006.01)
  *B60P 3/16* (2006.01)
  *B60K 6/48* (2007.10)
  *B60K 25/06* (2006.01)

(52) U.S. Cl.
  CPC ........... *B60P 3/16* (2013.01); *B60Y 2400/214* (2013.01); *Y02T 10/6221* (2013.01)

(56) References Cited

U.S. PATENT DOCUMENTS

| | | |
|---|---|---|
| 2003/0205422 A1 | 11/2003 | Morrow et al. |
| 2009/0095549 A1 | 4/2009 | Dalum et al. |
| 2009/0314563 A1 | 12/2009 | Burkholder |
| 2013/0276577 A1* | 10/2013 | Kroschel ............... B28C 5/4213 74/665 B |

FOREIGN PATENT DOCUMENTS

| | | |
|---|---|---|
| JP | 2003226192 | 8/2003 |
| JP | 2003301802 | 10/2003 |
| WO | 2013111002 | 8/2013 |

* cited by examiner

CONCRETE MIXER WITH PERFECTED AUXILIARY DEVICE

FIELD OF THE INVENTION

The present invention concerns a concrete mixer truck which has an auxiliary device, suitable when activated both to move the mixer truck, in determinate circumstances, and also to make the drum rotate in order to mix the concrete.

In particular, the auxiliary device uses the mechanical energy of the heat engine normally used in concrete mixer trucks to make available a quantity of energy which can be exploited both to move the vehicle that acts as a means of transport for the mixing drum, and also to make the drum itself rotate.

BACKGROUND OF THE INVENTION

The use of concrete mixer trucks is known, which using a rotating drum transport concrete from a production plant to the building site where the concrete is used.

Both during the loading step in the production plant, and during the transport step to the building site, the concrete has to be kept malleable, and so the rotating drum has to be kept in constant rotation so that the concrete does not harden.

It is known that, upon arrival at the building site, the mixer truck sometimes has to wait its turn to unload. During this waiting step too, the drum has to be kept in constant rotation.

It is also known that before the unloading step, the concrete undergoes a homogenization step, and to achieve this the drum of the mixer truck is made to turn at its maximum rotation speed.

It is also known that during the unloading of the concrete, the drum is made to rotate in the opposite direction to the mixing direction.

In known concrete mixer trucks, the rotation of the drum is normally achieved by means of a hydraulic motor, which is driven by a group of pumps made to rotate by a heat engine which is usually a diesel engine. The heat engine can also be the same one that moves the vehicle or it can be an independent auxiliary heat engine.

One considerable disadvantage of known concrete mixer trucks is that the heat engine, whether it is the only one which moves the vehicle, or whether it is both the above cited heat engines, in the place where the concrete mixer truck is loaded and at the building site, one or both must be kept functioning, both to move the mixer truck and to rotate the drum.

It is also known that heavy vehicles, such as concrete mixer trucks, as well as being a source of noise also emit noxious gases from the heat engines.

From documents JP-A-2003/226192, JP-A-2003/301802, and from document DE-U-20 2009 001416, a solution is known whereby the rotating drum of the concrete mixer truck is driven with the aid of an electric motor.

In particular document JP-A-2003/226192 describes a concrete mixer truck provided with a rotating drum directly connected by means of reduction members to the electric motor. The electric motor is fed, depending on the functioning conditions, either by an electric energy generator driven directly by the heat engine of the concrete mixer truck, or by batteries that accumulate electric energy.

This solution is limited, however, in that it has a reduced operating flexibility due mainly to the univocal power, entrusted each time only to the generator or only to the accumulation batteries, with a subsequent reduction in functioning autonomy.

US 2009/095549 A1 describes an energy generation system for a hybrid vehicle in which there is a power take-off (PTO) connected to the main engine of the vehicle, a source of rechargeable electric power, a hydraulic motor in direct or indirect mechanical communication with the power take-off and an electric motor in direct or indirect communication with the hydraulic motor.

In this document no alternative sources to recharge the electric power source are provided. Moreover, the presence of a hydraulic motor is in any case required.

In a patent application filed by Applicant on 26 Jan. 2012 under MI2012A000093, a solution is described based on which it is possible to move the rotating drum with accumulated energy and transformed into high-efficiency electric energy, with high electric yield; this solution guarantees considerable practicality and operating flexibility. Indeed it has different sources to generate or accumulate electric energy and also provides the synergic use of these sources to increase the functioning autonomy of the rotating drum.

Starting from this solution, in itself extremely efficient and flexible, Applicant has further developed the concept on which the auxiliary device that feeds the concrete drum is based, to achieve a situation in which the noxious gases released by the mixer truck are nearly non-existent at least in circumstances other than long transfers.

Another disadvantage faced is to provide an almost total reduction of the noise produced by the concrete mixer trucks during their own movement, on the road or in the areas of work.

One purpose of the present invention is therefore to obtain a concrete mixer truck equipped with an auxiliary device of the electric type, perfected with respect to that described in application MI'093, but which is able to simultaneously move, at least for a certain period, both the rotating drum and also the mean of transport or vehicle which transports it.

One purpose of the present invention is also to obtain a concrete mixer truck that can be moved by exclusively electric or electromechanical means, without requiring an application of the hydraulic type as provided for example in document JP-A-2003/301802 or US 2009/0095549, in order to drive the drum.

Another purpose of the present invention is to obtain a concrete mixer truck provided with electric means to actuate the rotating drum and to move the concrete mixer truck itself which are efficient, flexible, and which allow to obtain great functioning autonomy.

Another purpose of the present invention is to obtain a concrete mixer truck provided with an auxiliary device able to drive the mixing drum and to move the vehicle on which it is mounted, while keeping the heat engine or engines with which the concrete mixer truck is provided switched off during these operations.

It is however important to safeguard the health of the persons who are near the concrete mixer truck, including the operators in the loading site and in the building sites involved.

The invention thus sets itself the purpose of at least greatly reducing the emission of noxious gases both in the work places and in city areas, for example subject to traffic limitations or during restricted noise emission hours.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a concrete mixer truck according to the present invention, which overcomes the limits of the state of the art in a new and innovative way, comprises:

a vehicle provided at least with a heat engine, a movement unit with drive wheels, a clutch and a gearbox able to selectively transmit the mechanical energy produced by the heat engine to the movement unit;

a concrete mixer mounted on the vehicle and having a rotating drum;

an auxiliary device comprising at least a unit for generating electric energy and an electric motor selectively fed by the electric energy generating unit and mechanically connected to the rotating drum in order to make it selectively rotate.

According to an advantageous form of embodiment, the electric energy generating unit comprises:

an alternator selectively connectable to the heat engine and to the movement unit by means of the gearbox using a power take-off positioned between the clutch and the gearbox. Moreover, the alternator is configured to convert mechanical energy into alternate electric energy and vice versa;

at least an electric energy accumulator;

reversible electric energy conversion means, such as for example a current rectifier/alternator, connected to the accumulator and to the alternator to selectively take continuous electric energy from the former and to supply alternate electric energy to the latter, in order to move the drive wheels of the movement unit. Alternatively, the reversible conversion means can convert alternate electric energy produced by the alternator into continuous electric energy to be transferred to the accumulator, in order to recharge the latter.

In this way, a first kinematic-energetic chain is achieved advantageously comprising the at least one accumulator, the conversion means, the gearbox and the movement unit, which allows the stream of energy from the accumulator (electric energy) to the drive wheels of the movement unit (mechanical energy). The kinematic chain is advantageously independent from the heat engine and allows to move both the rotating drum and the vehicle, and therefore the concrete mixer truck in its entirety, using the auxiliary device.

It is thus possible, at least in situations other than long transfers, to not use the heat engine and therefore to considerably reduce both the emission of noxious gases and also the noise produced by the concrete mixer truck.

In alternative forms of embodiment, the auxiliary device also comprises at least a recovery device to recover the kinetic/mechanical energy produced by the movement unit. The device is connected to the at least one accumulator so as to transfer continuous electric energy to it.

According to one aspect of the present invention, the at least one kinetic/mechanical energy recovery device is the reversible type and is configured both to convert mechanical energy into continuous electric energy and also to carry out the opposite conversion.

Moreover, the kinetic/mechanical energy recovery device comprises at least an electronic converter of continuous electric energy into alternate energy, and vice versa, and at least an electromechanical actuator, connected to the electronic converter and to the movement unit. The electromechanical actuator is configured to convert alternate electric energy into mechanical energy to be supplied to the drive wheels of the movement unit, in order to move the vehicle of the concrete mixer. This is possible because, advantageously, the electronic converter is connected to the at least one accumulator to take continuous electric energy from it and to supply alternate electric energy to the at least one electromechanical actuator abovementioned.

In this way it is possible to identify a second kinematic-energy chain that comprises the reversible kinetic/mechanical energy recovery device and the at least one accumulator. The second kinematic energy chain can be disconnected from the heat engine of the vehicle and can supply, in the same way as described above, mechanical energy both to the drum and to the vehicle itself, taking it from the accumulator.

BRIEF DESCRIPTION OF THE DRAWINGS

These and other characteristics of the present invention will become apparent from the following description of some example forms of embodiment, with reference to the attached drawings wherein.

DETAILED DESCRIPTION OF SOME FORMS OF EMBODIMENT

The present invention complements and perfects the invention of MI2012A000093 (MI'093).

Figure 1:
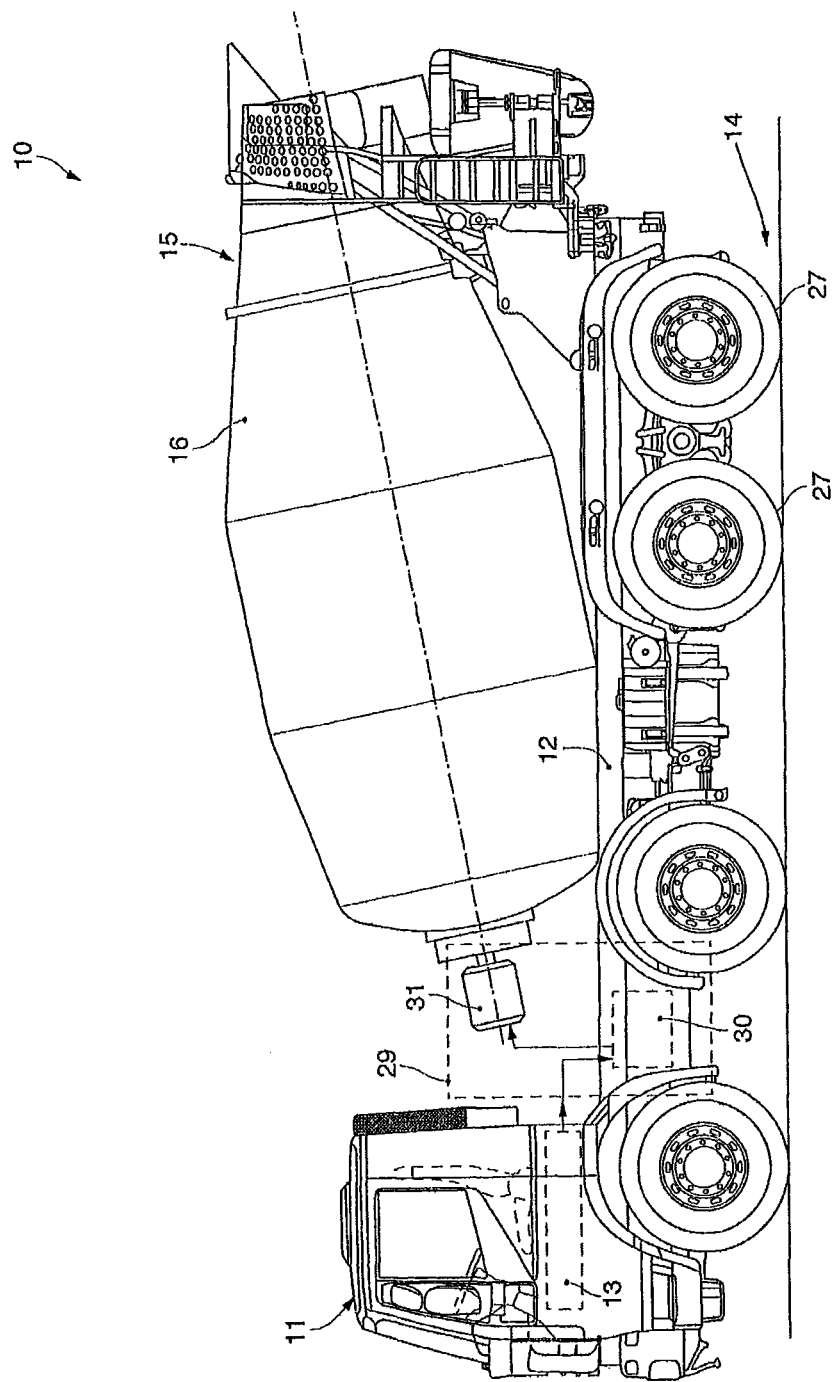
FIG. 1 is a lateral and schematic view of a concrete mixer truck according to the inventive idea of application MI'093.
Figure 2:
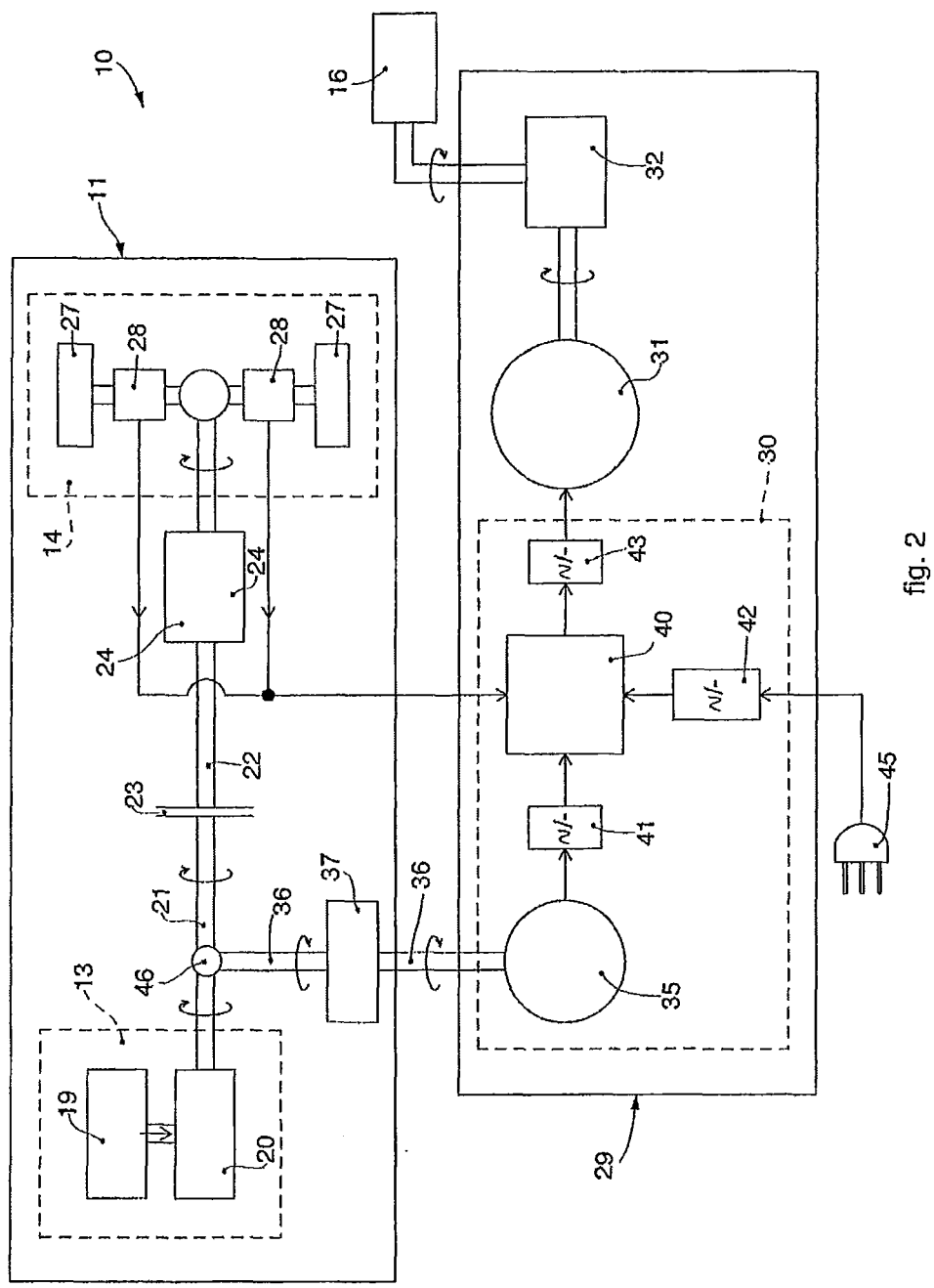
FIG. 2 is a schematized view of the concrete mixer truck in FIG. 1.

FIGS. 1 and 2 show the inventive idea proposed in said application and therefore part of the state of the art which the present invention intends to perfect. In particular, FIG. 1 shows a schematic lateral view of a concrete mixer truck, while FIG. 2 schematically shows the concrete mixer truck according to the inventive idea of application MI'093.

For the purposes of clarity and completeness of the description, in the present application the same reference numbers are maintained as in application MI'093, which is incorporated entirely herewith by way of reference.

With reference to FIG. 1, a concrete mixer truck 10 comprises a vehicle 11, for example a truck, of any known type, provided with a frame 12 on which a rotating drum 16 of a concrete mixer 15 is mounted. For example the capacity of the drum 16 is comprised between 4 cubic meters and 12 cubic meters.

The vehicle 11 is provided with a main drive unit 13 that comprises a heat engine 20 (FIG. 2) for example the diesel type, powered by fuel contained in a tank 19. The heat engine 20 is provided with a drive shaft 21 that makes a transmission shaft 22 of a movement unit 14 rotate, provided with drive wheels 27, by means of a clutch 23 and a gearbox 24 of any known type.

The heat engine 20, which for example is able to deliver a power comprised between 250 kW and 350 kW, by means of the movement unit 14, allows the vehicle 11 to travel on the road, for example from the plant where the concrete is produced to a building site and vice versa.

One or more electronic kinetic/mechanical energy recovery devices 28, also known as KERS (Kinetic Energy Recovery System) are associated with the drive wheels 27, and allow to recover part of the kinetic/mechanical energy of the movement unit 14 during the deceleration and braking of the concrete mixer truck 10.

An auxiliary device 29 is mounted on the vehicle 11, suitable to make the drum 16 and/or the drive wheels 27 selectively rotate, in order to move the vehicle 11 itself.

In this case, the auxiliary device 29 comprises the electronic kinetic/mechanical energy recovery devices 28 abovementioned and an electric energy generating unit 30, suitable to power an electric motor 31, for example the three-phase type, which is mechanically connected to the drum 16, for example by means of reduction members such as a speed reducer 32.

The electric energy generating unit 30 comprises an alternator 35, which is connected to the drive shaft 21 by a driven shaft 36 with the possible interposition of a speed reducer 37.

The driven shaft 36 and the possible speed reducer 37 constitute a so-called power take-off, connected to the drive shaft 21 for example by means of a joint 46, which can be any known type.

In the specific example shown in FIG. 2, the joint 46 is positioned upstream of the clutch 23 and upstream of the gearbox 24, in a kinematic chain which goes from the heat engine 20 to the drive wheels 27.

The alternator 35 is suitable to transform the mechanical energy of the drive shaft 21 into electric energy, in the form of alternate current, which is subsequently transformed into the continuous current needed to charge one or more rechargeable electric energy accumulators 40, for example the lithium type.

The electric energy generating unit 30 also comprises the following three electric energy conversion means, in this case three current converters:

a first convertor 41, to transform the alternate tension produced by the alternator 35 into continuous tension to feed the at least one accumulator 40;

a second convertor 43, which in this case is a current inverter, to transform the continuous tension available from the accumulators 40 into an alternate tension, needed to feed the electric motor 31, and another and possible third convertor 42, to transform the alternate tension coming from an external electric network 45 into continuous tension, needed to feed the accumulators 40. The first convertor 41 and the third convertor 42 can each comprise one or more current rectifiers to allow adequate feed of the accumulators 40.

The electric motor 31, powered by the electric energy generating unit 30, is able to supply the necessary power, for example comprised between 50 kW and 80 kW, to rotate the drum 16.

The accumulators 40 can be selectively recharged in one of the following three ways.

A first recharging mode provides to connect the electric energy generating unit 30 to an external electric network 45 by a connection between the external electric network 45 and one or more of said accumulators 40. In this case the alternate current supplied by the external electric network 45 is converted through the third convertor 42 into a direct current to recharge the accumulators 40. Recharging the accumulators 40 by connecting them to the electric network 45 can be fast if an industrial network is used, or slower if a domestic type electric network is used. To this purpose, the electric energy generating unit 30 can be provided with suitable electric components to allow connection either to a domestic network or to an industrial network.

A second recharging mode provides to use the mechanical energy derived from the drive shaft 21. In fact, by means of the driven shaft 36 the mechanical energy is able to render the alternator 35 active, which by means of the first convertor 41 is able to supply the accumulators 40 with the energy needed to recharge them.

A third recharging mode provides that the accumulators 40 are recharged using part of the kinetic/mechanical energy of the movement unit 14, by means of electronic kinetic/mechanical energy recovery devices 28.

The electric motor 31 is powered directly by the accumulators 40 which, depending on the functioning conditions, are selectively recharged directly either by the alternator 35 or by the electric network 45 or by the electronic kinetic/mechanical energy recovery devices 28 or alternatively by a combination of these three. This solution allows to optimize the recharging of the accumulators 40 irrespective of the specific functioning requirements required instantaneously by the electric motor 31. This allows to obtain an extremely versatile electric energy generating unit 30, with high performance and high functioning autonomy.

According to a variant connected to the perfected version of the present invention, if the transfer journeys of the concrete mixer truck 10 are too short to allow to sufficiently recharge the accumulators 40, when the concrete mixer truck 10 is stationary the connection to the electric network 45 can be activated.

The concrete mixer truck 10 as described heretofore functions as follows.

When the mixer truck 10 is stationary for a relatively long period, for example more than one hour, for example when it is at a concrete production plant in order to be filled, the first recharging mode of the electric energy accumulators 40 is used.

When the concrete mixer truck 10 is moving and the drum 16 is made to rotate at low revs by the electric motor 31, the accumulators 40 are simultaneously recharged, exploiting part of the mechanical energy of the drive shaft 21, that is, by means of the second recharging mode, and possibly part of the electric energy produced by the electronic kinetic/mechanical energy recovery devices 28, that is, using the third recharging mode.

On the contrary, when the concrete mixer truck 10 is stationary in the building site, or nearby, and the drum 16 must continue to rotate, the power is supplied to the electric motor 31 by exclusively exploiting the electric energy of the accumulators 40. This step is characteristic of the functioning of the concrete mixer truck 10 when the concrete is unloaded, since the accumulators 40 are completely charged.

If the accumulators 40 are completely discharged, it is always possible to take power from the heat engine 20, to be converted into electric energy by the alternator 35.

Figure 3:
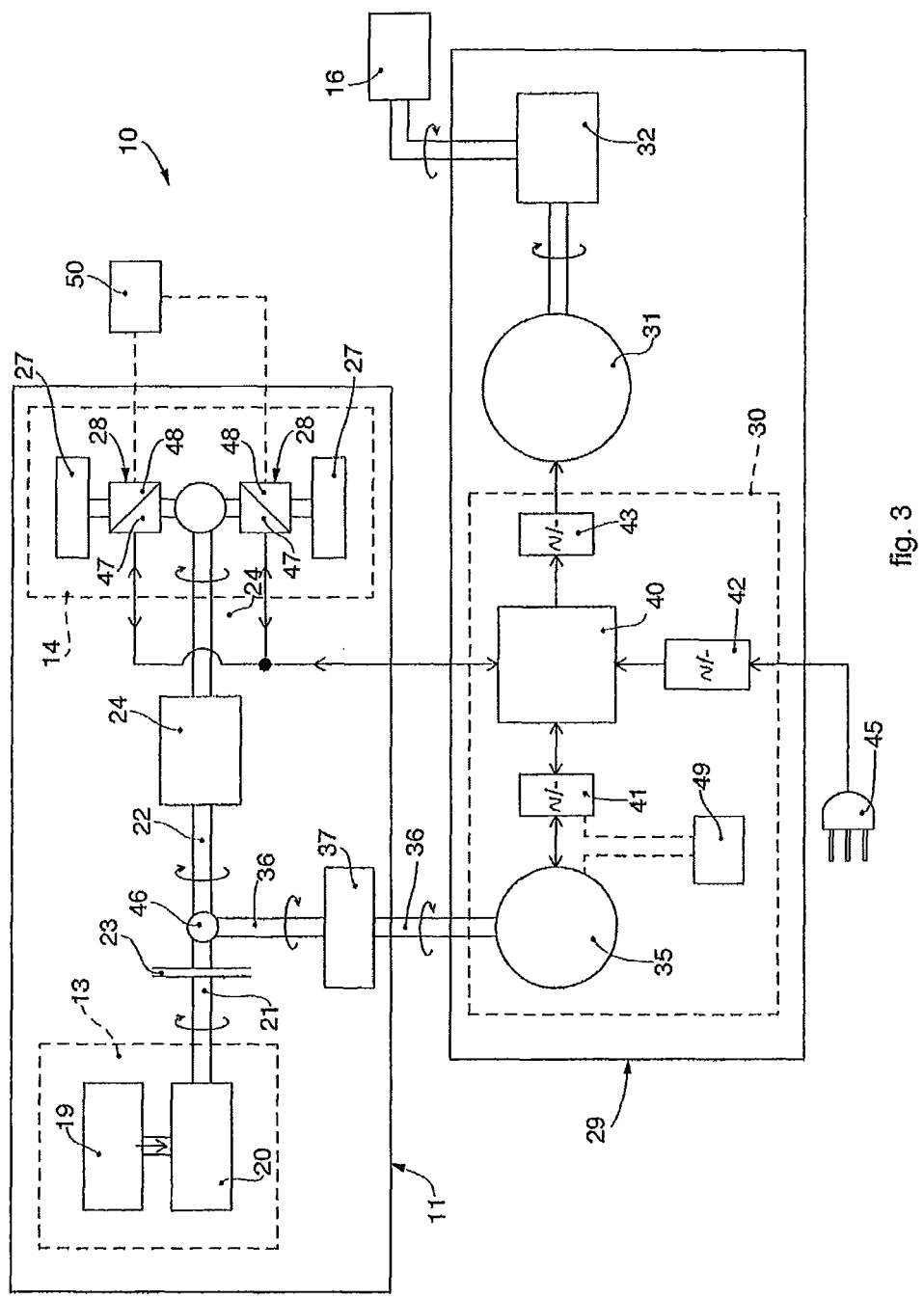
FIG. 3 is a schematized view of the concrete mixer truck in FIG. 1, according to the present invention.
Figure 4:
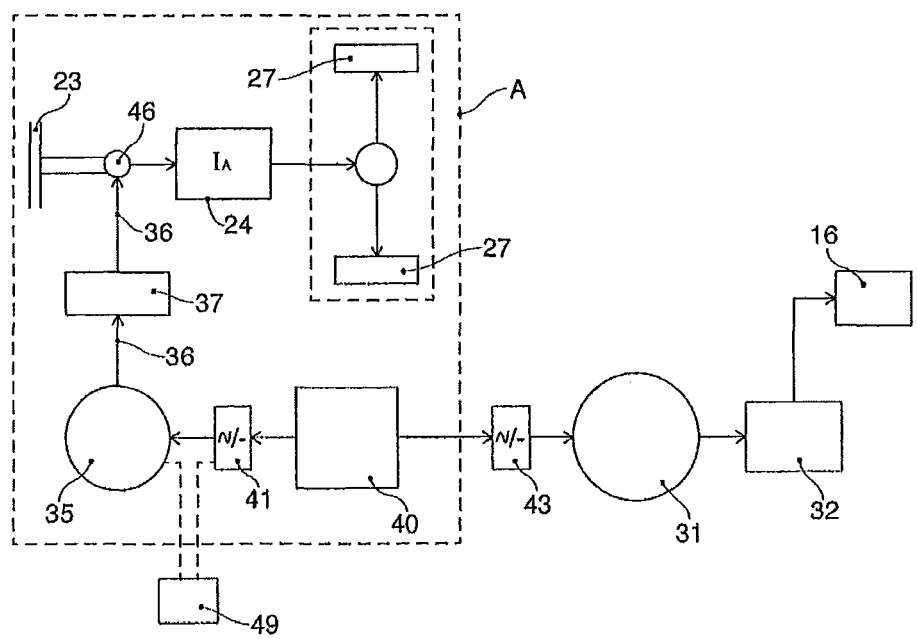
FIGS. 4 and 5 are schematized views of functional parts of the concrete mixer truck in FIG. 3.
Figure 5:
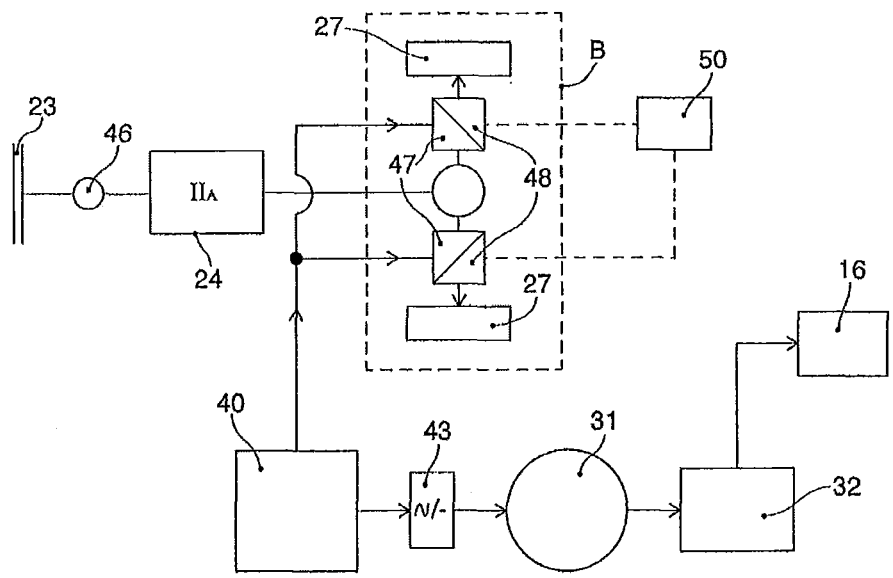

The perfected form of the present invention compared with the solution described heretofore is shown schematically and by way of example in FIGS. 3, 4 and 5, attached herewith.

In this perfected solution, unlike what is described above, it is provided that the connection joint 46 between the driven shaft 36 and the drive shaft 21 is put in an intermediate position between the clutch 23 and the gearbox 24.

In this way, by acting on the clutch 23, it is possible to make a first kinematic-energetic chain (reference A in FIG. 4) separate, autonomous and independent from the drive unit 13 and therefore from the heat engine 20. The first kinematic-energetic chain A comprises the gearbox 24, the drive wheels 27, the driven shaft 36, the possible reducer 37, the alternator 35, the first convertor 41 and the accumulators 40.

Furthermore, in the same way, by disconnecting the clutch 23, it is possible to make a second kinematic-energetic chain (reference B in FIG. 5) separate, autonomous and independent from the heat engine 20. The second kinematic-energetic chain B comprises the electronic kinetic/mechanical energy recovery devices 28, the drive wheels 27, and the accumulators 40.

Both the kinematic-energetic chains allow to exploit the electric energy accumulated in the accumulators 40 both to move the entire concrete mixer truck 10 and also to move the rotating drum 16 also when the heat engine 20 is completely switched off.

It therefore becomes possible to eliminate the emission of noxious gases and to reduce acoustic emissions, which represents the ideal condition for passing through city zones with limited traffic, or at restricted noise emission times.

In the forms of embodiment indicated by way of example in FIGS. 3 and 4, the first convertor 41 is advantageously the reversible type, that is, configured to have both the characteristics of a current rectifier and also those of a current inverter.

This condition can be obtained, for example, by making the first convertor 41 with a plurality of semi-conductor switches, for example with MOSFET transistors (Metal-Oxide-Semiconductor-Field-Effect Transistors) or IGBT transistors (Insulated-Gate Bipolar Transistors). The first convertor 41 can also consist of an integrated circuit in which diodes are also connected in anti-parallel with the transistors.

In the same way, the kinetic/mechanical energy recovery devices 28 shown schematically in FIGS. 3 and 5 are advantageously the reversible type, that is, they are configured to implement both the cited braking function and also the motor function. To this purpose, they too can consist of electronic converters and switches 47, such as for example said MOSFET and/or IGBT. Furthermore, the kinetic/mechanical energy recovery devices 28 can also include electromechanical actuators 48 connected to the drive wheels 27.

Switching between the functioning of the first convertor 41 as inverter and the functioning as rectifier is managed by a command unit 49 connected to it and to the alternator 35. Simultaneously with this switching, the command unit 49 is able to control also the behavior of the alternator 35, which can behave as a generator to recharge the accumulators 40 when the first convertor 41 functions as a current rectifier, whereas it can behave as a motor to move the concrete mixer truck 10 when the first convertor 41 functions as an inverter.

In particular, this latter behavior is possible thanks to the presence of the first kinematic-energetic chain A. In fact, by disengaging the clutch 23 it is possible to disconnect the heat engine 20 from the drive wheels 27. The gearbox 24 then allows to engage a first auxiliary gear $I_A$ to select the first kinematic-energetic chain A, in which the alternator 35 is connected to the drive wheels 27 through the driven shaft 36, the possible speed reducer 37, the joint 46 and the transmission shaft 22.

In particular, FIG. 4 indicates the stream of energy that goes from the accumulators 40 to the drive wheels 27 when the first auxiliary gear $I_A$ is engaged.

When the first auxiliary gear $I_A$ is engaged, the control unit 49 sets the functioning of the first convertor 41 as current inverter, and commands electric energy to be taken from the accumulators 40.

From this functioning of the first convertor 41, there is a consequent behavior of the alternator 35 as motor to move the drive wheels 27 and consequently the concrete mixer truck 10.

During these operations, the rotating drum 16 that contains the concrete can be moved as described above by the electric motor 31, which in turn takes electric energy from the accumulators 40, converted by the second convertor 43.

It is therefore clear that both the rotating drum 16 and the concrete mixer truck 10 in its entirety can be driven and moved by the components of the auxiliary device 29 belonging to the first kinematic-energetic chain A, as an alternative to the drive unit 13 comprising the heat engine 20. The latter, after being disconnected by disengaging the clutch 23 and engaging the first auxiliary gear $I_A$ in the gearbox 24, can also be switched off, without this influencing the operativity of the concrete mixer truck 10.

In order to return the latter into a condition where the accumulators 40 are recharged in the second recharging mode, it is sufficient to engage the clutch 23 and disengage the first auxiliary gear $I_A$, in order to connect the drive shaft 21 to the alternator 35.

At the same time, the control unit 49 can return the functioning of the first convertor 41 to rectifier mode, and consequently the alternator 35 to generator mode.

The auxiliary device 29 itself allows another possibility of moving the concrete mixer truck 10 and the rotating drum 16 when the heat engine 20 is switched off. This possibility is supplied by a second auxiliary gear $II_A$, which can be engaged in the gearbox 24 as an alternative to the first auxiliary gear $I_A$, after the clutch 23 has been disengaged.

The second auxiliary gear $II_A$ allows to select the second kinematic-energetic chain B.

A control device 50 may be provided to manage the functioning of the kinetic/mechanical energy recovery devices 28, which according to the present invention are invertible and bidirectional, and to set the functioning thereof in braking mode, or motor mode.

In braking mode, they perform the function of recharging the accumulators 40 in the third recharging mode previously described.

When the second auxiliary gear $II_A$ is engaged, the control device 50 can command the functioning of the electronic converters 47 so that they take electric energy from the accumulators 40 and transfer it to the electromechanical actuators 48.

The electromechanical actuators 48 are configured to make the drive wheels 27 rotate and hence allow the movement of the concrete mixer truck 10.

In this case too, engaging the second auxiliary gear $II_A$ does not change the possibility of taking energy accumulated in the accumulators 40 by the electric motor 31 that drives the rotating drum 16.

It is therefore evident that the concrete mixer truck 10 according to the present invention can also be moved when the heat engine 20 is switched off, thanks to the drive energy supplied by the kinetic/mechanical energy recovery devices 28 belonging to the auxiliary device 29.

Disengaging the second auxiliary gear $II_A$ and engaging the clutch 23 returns the concrete mixer truck 10 to the conditions where it is possible to move the vehicle 11 by the drive unit 13.

Furthermore, simultaneously with said disengagement, the control device 50 can return the functioning of the kinetic/mechanical energy recovery devices 28 to the braking condition, so as to recharge the accumulators 40.

It is clear that modifications and/or additions of parts may be made to the concrete mixer truck 10 as described heretofore, without departing from the field and scope of the present invention.

It is also clear that, although the present invention has been described with reference to some specific examples, a person of skill in the art shall certainly be able to achieve many other equivalent forms of mixer truck, having the characteristics as set forth in the claims and hence all coming within the field of protection defined thereby.

The invention claimed is:

1. A concrete mixer truck comprising:
a vehicle provided at least with a heat engine equipped with a drive shaft, a movement unit with drive wheels, a clutch and a gearbox to selectively transmit the mechanical energy of said heat engine to said movement unit;
a concrete mixer mounted on said vehicle and having a rotating drum;
an auxiliary device comprising at least a unit for generating electric energy and an electric motor selectively fed by said electric energy generating unit and mechanically connected to said rotating drum in order to make it selectively rotate;
wherein said electric energy generating unit comprises:
an alternator selectively connectable to said heat engine and to said movement unit by means of said gearbox using a power take-off positioned between said clutch and said gearbox, said alternator being configured to convert mechanical energy produced by the rotation of said drive shaft into alternate electric energy and vice versa;
at least an electric energy accumulator;
reversible electric energy conversion means connected to said at least one accumulator and to said alternator to selectively take continuous electric energy from the at least one accumulator and to supply alternate electric energy to said alternator, in order to selectively move the drive wheels of said movement unit, or to convert the alternate electric energy produced by said alternator into continuous electric energy to be transferred to said at least one accumulator in order to selectively recharge said at least one accumulator;
connection means between said accumulator and an external electric network to selectively recharge said accumulator by means of said external electric network;
connection means between said accumulator and a kinetic/mechanical energy recovery device produced by said movement unit in order to selectively recharge said accumulator (40) by means of said kinetic/mechanical energy recovery device.

2. The concrete mixer truck as in claim 1, wherein said at least one kinetic/mechanical energy recovery device is of the reversible type and comprises at least an electronic converter of continuous electric energy into alternate energy, and vice versa, and at least an electromechanical actuator, connected to said at least one electronic converter and to said movement unit and configured to convert alternate electric energy into mechanical energy to be supplied to the drive wheels of said movement unit, said electronic converter being connected to said at least one accumulator to take continuous electric energy from it and to supply alternate electric energy to said at least one electromechanical actuator.

3. The concrete mixer truck as in claim 1, wherein said clutch is selectively positionable in a disengaged position, in which said heat engine is disconnected from said gearbox and from said movement unit, and in that said gearbox is configured to engage, when said clutch is in said disengaged position, a first auxiliary gear ($I_A$) which defines a first kinematic-energetic chain (A) in which a stream of energy is directed from said at least one accumulator to the drive wheels of said movement unit, through said reversible conversion means and said alternator.

4. The concrete mixer truck as in claim 1, wherein characterized in that said clutch is selectively positionable in a disengaged position, in which said heat engine is disconnected from said gearbox and from said movement unit and in that said gearbox is configured to engage, when said clutch is in said disengaged position, a second auxiliary gear ($II_A$) which defines a second kinematic-energetic chain (B) in which a stream of energy is directed from said at least one accumulator to the drive wheels of said movement unit through said at least one kinetic/mechanical energy recovery device.

5. The concrete mixer truck as in claim 3, wherein said auxiliary device comprises a command unit, electronically connected to said reversible conversion means and to said alternator, in order to switch, simultaneously with the engaging of said first auxiliary gear ($I_A$), the functioning of the conversion means from current rectifiers to current inverters, and the functioning of said alternator from alternator to generator.

6. The concrete mixer truck as in claim 4, wherein said auxiliary device comprises a control device, electronically connected to said at least one kinetic/mechanical energy recovery device, in order to switch, simultaneously with the engaging of said second auxiliary gear ($II_A$), the functioning of the at least one kinetic/mechanical energy recovery device from converter of mechanical energy into electric energy to converter of electric energy into mechanical energy.

7. The concrete mixer truck as in claim 1, wherein in that said reversible conversion means comprise at least an integrated circuit provided at least with transistors chosen from MOSFET transistors (Metal-Oxide-Semiconductor-Field-Effect Transistors) and IGBT transistors (Insulated-Gate Bipolar Transistors) and diodes connected in anti-parallel.

8. The concrete mixer truck as in claim 1, wherein said auxiliary device comprises at least a converter, connected to said at least one accumulator and to said electric motor, in order to take continuous electric energy from said accumulator and supply alternate electric energy to said electric motor, in order to move said rotating drum.

9. A method to move a concrete mixer truck comprising a vehicle provided with a heat engine equipped with a drive shaft, whose motion is selectively transmitted to a movement unit with drive wheels by means of a clutch and a gearbox, and a concrete mixer mounted on said vehicle and having a rotating drum rotated by means of an auxiliary device comprising at least an electric energy generating unit and an electric motor selectively fed by said electric energy generating unit and mechanically connected to said rotating drum in order to make it selectively rotate, wherein it provides the following operations:
disengaging said clutch to disconnect said heat engine from said movement unit;
engaging a first auxiliary gear ($I_A$) by means of said gearbox to define a first kinematic/energetic chain (A) comprising an alternator connected to at least one electric energy accumulator and, using a power take-off positioned between said clutch and said gearbox, to said movement unit;
switching, simultaneously with the engaging of said first auxiliary gear ($I_A$), the functioning of said alternator from converter of mechanical energy into alternate electric energy to generator of mechanical energy from alternate electric energy;

converting, after said switching, said continuous electric energy coming from said accumulator into alternate electric energy and transferring said alternate electric energy to said alternator;

transferring said mechanical energy to the drive wheels of said movement unit;

taking, after the engaging of said first auxiliary gear ($I_A$), by a converter connected to said at least one accumulator and to said electric motor, continuous electric energy from said accumulator and subsequently converting said continuous electric energy into alternate electric energy;

supplying said alternate electric energy to said electric motor in order to move said rotating drum, wherein said accumulator is selectively recharged by connecting said accumulator to an external electric network by connecting said accumulator to a kinetic/mechanical energy recovery device produced by said movement unit, or directly from the alternator connected to said drive shaft.

10. The method as in claim 9, wherein, after the disengagement of said clutch and before alternate electric energy is supplied to the electric motor, it provides to carry out the following operations:

engaging a second auxiliary gear ($II_A$) to define a second kinematic/energetic chain (B) comprising said kinematic/mechanical energy recovery device, said at least one accumulator and said movement unit;

switching the functioning of said kinetic/mechanical energy recovery device from energy recovery to mechanical energy generation;

taking, after said switching, continuous electric energy from said at least one accumulator by said kinetic/mechanical energy recovery device;

converting said continuous electric energy into alternate and subsequently into mechanical energy;

supplying said mechanical energy to the drive wheels of said movement unit taking, after the engaging of said second auxiliary gear ($II_A$), by said converter, continuous electric energy from said accumulator and subsequently converting said continuous electric energy into alternate electric energy.

* * * * *